United States Patent
Suzuki

(10) Patent No.: US 8,215,769 B2
(45) Date of Patent: Jul. 10, 2012

(54) METHOD AND MANUFACTURE METHOD OF SPECTACLE LENS

(75) Inventor: Yohei Suzuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 12/639,815

(22) Filed: Dec. 16, 2009

(65) Prior Publication Data

US 2010/0214531 A1    Aug. 26, 2010

(30) Foreign Application Priority Data

Feb. 23, 2009    (JP) .................................. 2009-039603

(51) Int. Cl.
  *G02C 7/00*    (2006.01)
  *G02C 7/02*    (2006.01)
(52) U.S. Cl. .......... 351/159.76; 351/159.73; 351/159.75
(58) Field of Classification Search .................. 351/159, 351/177, 159.73–159.77
  See application file for complete search history.

(56) References Cited

U.S. PATENT DOCUMENTS

| | | | |
|---|---|---|---|
| 4,729,651 A * | 3/1988 | Kitani | 351/169 |
| 6,318,859 B1 | 11/2001 | Baudart et al. | |
| 2003/0107707 A1 | 6/2003 | Fisher et al. | 351/177 |
| 2005/0041205 A1* | 2/2005 | Yamakaji | 351/177 |
| 2007/0103641 A1* | 5/2007 | Bonnin | 351/209 |
| 2007/0242218 A1 | 10/2007 | Berthezene et al. | 351/168 |
| 2007/0242221 A1 | 10/2007 | Guilloux et al. | 351/177 |
| 2008/0106697 A1 | 5/2008 | Pedrono | 351/246 |
| 2010/0085536 A1* | 4/2010 | Drobe | 351/169 |
| 2010/0296053 A1* | 11/2010 | Marin et al. | 351/177 |

FOREIGN PATENT DOCUMENTS

| | | |
|---|---|---|
| FR | 2753805 A | 3/1998 |
| JP | 2003-523244 | 8/2003 |
| JP | 2007-241276 | 9/2007 |
| JP | 2007-256957 | 10/2007 |
| JP | 2008-511033 | 4/2008 |
| JP | 2008-521027 | 6/2008 |

OTHER PUBLICATIONS

M. Jalie, "Progressive Lenses Part 2, The new generation" Optometry Today, Association of Optometrists, London, GB, pp. 35-45, Jun. 17, 2005.
European search report for corresponding European application 10154079.7 lists the references above.

* cited by examiner

*Primary Examiner* — Jordan Schwartz
(74) *Attorney, Agent, or Firm* — DLA Piper LLP (US)

(57) ABSTRACT

A design method of a spectacle lens, includes: measuring an angle formed by a direction of a head of a person seeing the front without lens and a direction of the head of the person seeing an object located in a direction angled to the front direction of the person without lens to calculate a visual action index $M_n$ according to the following equation (1) as an initial value; temporarily designing a spectacle lens based on the visual action index; and simulating visual action of the person wearing the temporarily designed spectacle lens and correcting the visual action index based on the simulation result $$M_n = \frac{\beta_n}{\alpha_n} \quad (1)$$

wherein $\alpha_n$ is an angle formed by the front direction of the person and a direction in which the object actually exists, $\beta_n$ is a rotation angle of the head of the person seeing the object without lens, and n represents the object.

3 Claims, 5 Drawing Sheets

METHOD AND MANUFACTURE METHOD OF SPECTACLE LENS

BACKGROUND

1. Technical Field

The present invention relates to a design method and a manufacture method of a spectacle lens performed according to a personal visual action.

2. Related Art

A person has his/her own way of seeing an object. For example, when seeing the side or the upper or lower region of the person, he or she rotates the head or the eyes (hereinafter referred to as visual action). The rotation angles of the head and the eyes are peculiar to the person, and thus various spectacle lens design methods capable of coping with individual visual actions variable for each person have been proposed (for example, see JP-T-2008-521027 (the term "JP-T" as used herein means a published Japanese translation of a PCT patent application), JP-T-2008-511033, JP-A-2007-256957, JP-A-2007-241276, and JP-T-2003-523244).

According to the technologies disclosed in the above references, a lens is designed according to personal visual action. However, these technologies give no consideration to the prismatic effect produced when an object is seen through a spectacle lens.

The power of the spectacle lens varies for each prescription or design, and the position at which an object is recognized changes whether the object is seen without lens or seen through spectacle lens due to the prismatic effect. For example, when the object is seen through a convex lens, the object is recognized in a region shifted toward the center of the lens from the direction in which the object actually exists. In case of a concave lens, however, the object is recognized in a region shifted toward the periphery of the lens from the direction in which the object actually exists.

Since the position at which the object is recognized varies due to the prismatic effect of the lens, the rotation angle of the head when the person sees the object through the spectacle lens is different from the rotation angle of the head when the person sees the object without lens. For example, when the object is seen through the convex lens, the rotation angle of the head is larger than that when the object is seen without lens. On the contrary, when the object is seen through the concave lens, the rotation angle of the head is smaller than that when the object is seen without lens. When the prescription of the lens for the left eye is different from that for the right eye, the rotation angle of the left eye is also different from that of the right eye at the time of rotation of the eyeballs for seeing the object. For reducing this difference, the head tends to be rotated through large angle.

As can be understood, a personal visual action is greatly related to the prismatic effect of the spectacle lens. Thus, according to the methods disclosed in the above references, accurate correspondence between the rotation angle of the head and the lens design is difficult to be established. Accordingly, a lens sufficiently comfortable and satisfactory for a user cannot be provided in some cases.

SUMMARY

It is an advantage of some aspects of the invention to provide a design method and a manufacture method of a spectacle lens capable of coping with individual visual actions and providing a more comfortable spectacle lens for a user.

A design method of a spectacle lens according to a first aspect of the invention includes: measuring an angle formed by a direction of a head of a person seeing the front without lens and a direction of the head of the person seeing an object located in a direction angled to the front direction of the person without lens to calculate a visual action index $M_n$ according to the following equation (1) as an initial value; temporarily designing a spectacle lens based on the visual action index; and simulating visual action of the person wearing the temporarily designed spectacle lens and correcting the visual action index based on the simulation result.

$$M_n = \frac{\beta_n}{\alpha_n} \quad (1)$$

In equation (1), $\alpha_n$ is an angle formed by the front direction of the person and a direction in which the object actually exists, $\beta_n$ is a rotation angle of the head of the person seeing the object without lens, and n represents the object.

The visual action refers to rotation of the head or the eyes of the person for seeing the object, and can be expressed by measured rotation angle of the head and rotation angles of the eyes of the person seeing the object. The visual action index is an index indicating the degree of movement of the head and the eyes of the person for seeing the object.

The power of the spectacle lens varies for each prescription, and the direction in which the object is recognized varies due to prismatic effect. Thus, the visual action index obtained without spectacle lens differs from the visual action index obtained through the spectacle lens.

According to this aspect of the invention, the degree of visual action without lens is initially calculated as the visual action index, and the spectacle lens is temporarily designed based on the calculated visual action index. Then, the visual action index is corrected based on the degree of the visual action obtained through the spectacle lens temporarily designed.

That is, the spectacle lens is designed considering the visual action without lens and the visual action through the designed spectacle lens. Thus, the lens design copes with visual action variable according to the prismatic effect of the spectacle lens. Accordingly, a spectacle lens more comfortable for a person for wearing can be designed.

It is preferable that the step of correcting the visual action index in the design method of the spectacle lens according to the first aspect of the invention is performed until the visual action index $M_n$ is converged.

The term "converged" herein means that the corrected visual action index $M_n$ is contained within a predetermined range.

According to this structure, the design copes with the visual action obtained through the spectacle lens even when difference between the visual action without lens and the visual action through the spectacle lens is produced. Thus, a spectacle lens more comfortable for a person for wearing can be designed.

It is preferable that the step of correcting the visual action index in the design method of the spectacle lens according to the first aspect of the invention corrects the visual action index $M_n$ according to the following equation (2).

$$M'_n = M_n \left( \frac{\alpha'_n + |\alpha'_{nL} - \alpha'_{nR}|}{\alpha_n} \right) \quad (2)$$

In equation 2, $M'_n$ is visual action index after correction, $\alpha_n$ is an angle formed by the front direction of the person and the direction in which the object actually exists, $\alpha'_{nL}$ is an angle formed by the front direction of the person and an direction in which the object is recognized by the left eye of the person through the spectacle lens, $\alpha'_{nR}$ is an angle formed by the front direction of the person and an direction in which the object is recognized by the right eye of the person through the spectacle lens, $\alpha'_n$ is the angle corresponding to the stronger eye of the person in the angles $\alpha'_{nL}$ and $\alpha'_{nR}$, and n represents the object.

According to this structure, the spectacle lens coping with the visual action through the spectacle lens can be designed by measuring the degree of the visual action without lens similarly to the structure described above. Thus, a spectacle lens more comfortable for a person for wearing can be provided.

A manufacture method of a spectacle lens according to a second aspect of the invention uses the design method of the spectacle lens described above.

According to the second aspect of the invention, the spectacle lens is manufactured based on the design determined by the design method described above. Thus, advantages similar to those described above can be offered.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
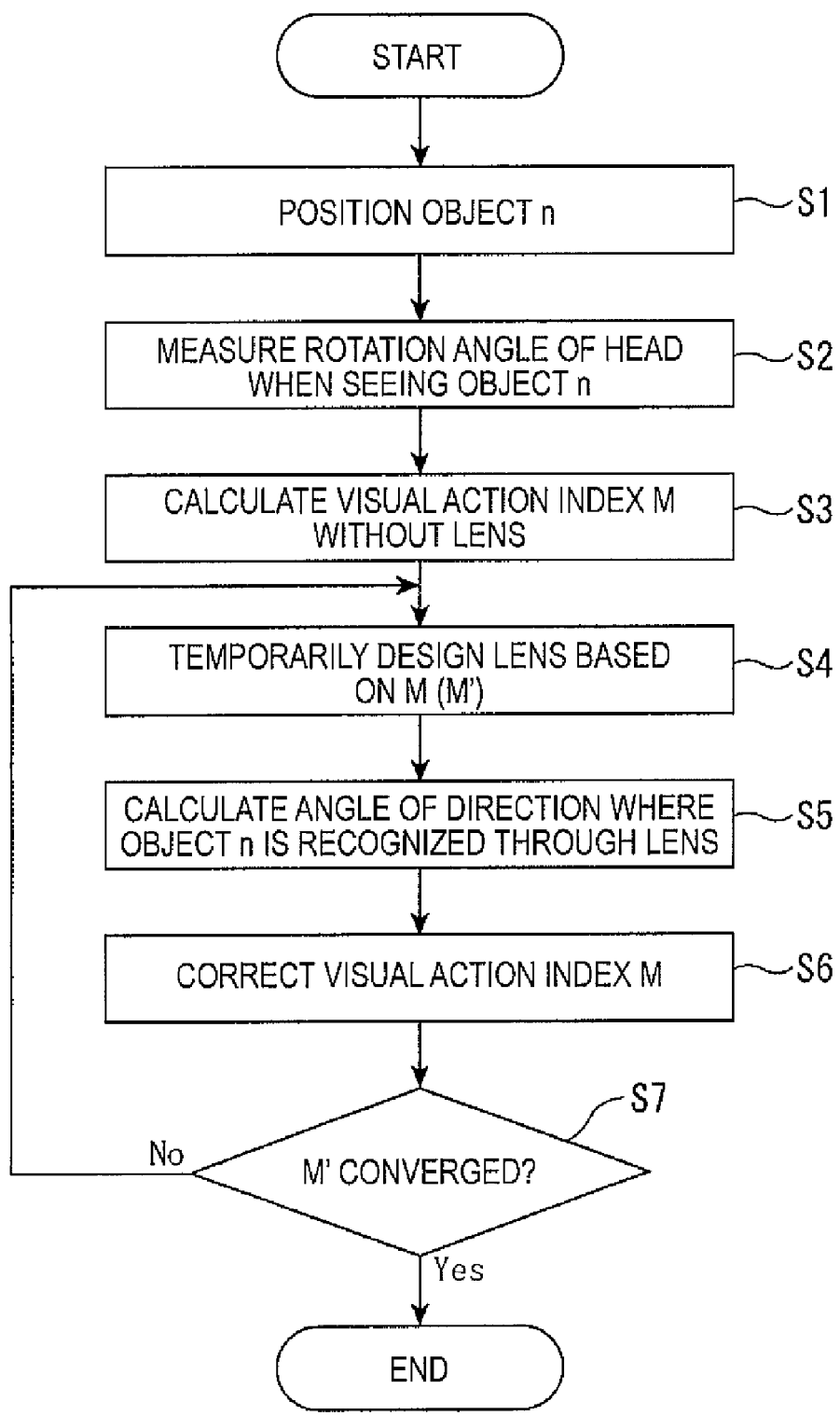
FIG. 1 is a flowchart showing a design method of a spectacle lens according to an embodiment of the invention.

A design method of a spectacle lens according to an embodiment of the invention is hereinafter described with reference to a flowchart shown in FIG. 1.

In this embodiment, a progressive-power lens is used as a spectacle lens. The progressive-power lens is an aspheric lens which includes two refractive areas having different powers, and a progressive area disposed between the refractive areas and having progressively variable power (dioptric power).

1. Design Method of Spectacle Lens

Figure 2:
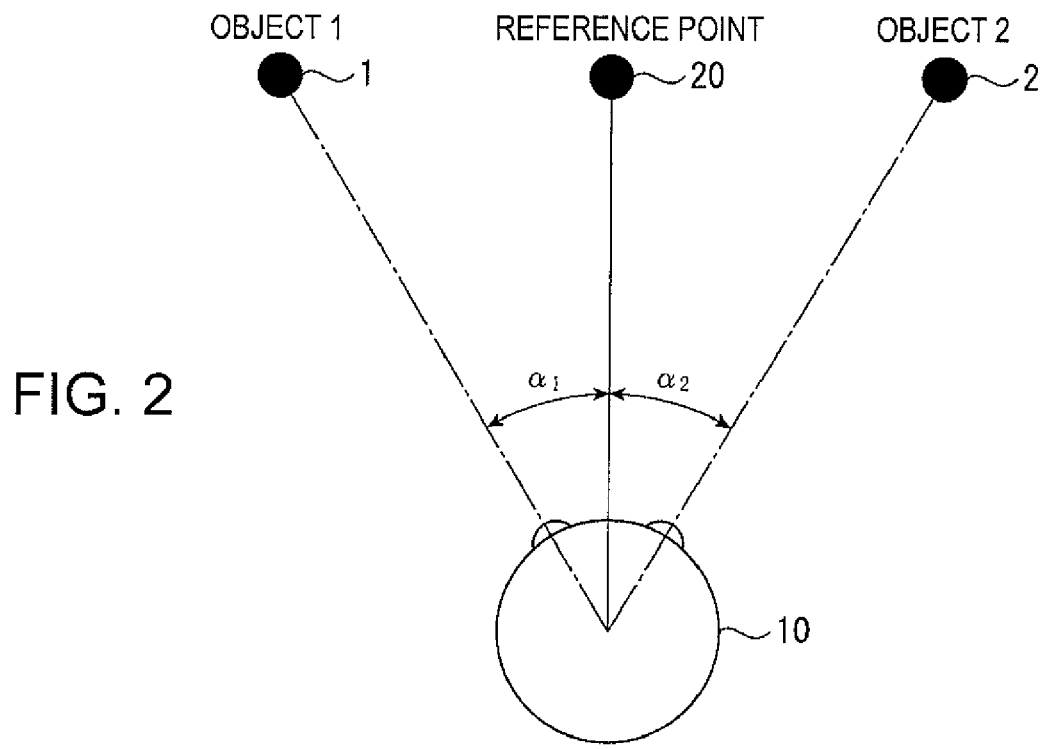
FIG. 2 shows positional relationship between a target person and objects according to the embodiment.

Initially, an object 1 is disposed in the left front of a target person 10, and an object 2 is disposed in the right front of the target person 10 as illustrated in FIG. 2. The front direction of the target person 10 is a reference point 20. An angle formed by the direction of a line connecting the target person 10 and the reference point 20 and the direction of a line connecting the target person 10 and the object 1 is $\alpha_1$. An angle formed by the direction of the line connecting the target person 10 and the reference point 20 and the direction of a line connecting the target person 10 and the object 2 is $\alpha_2$ (step S1).

Figure 3:
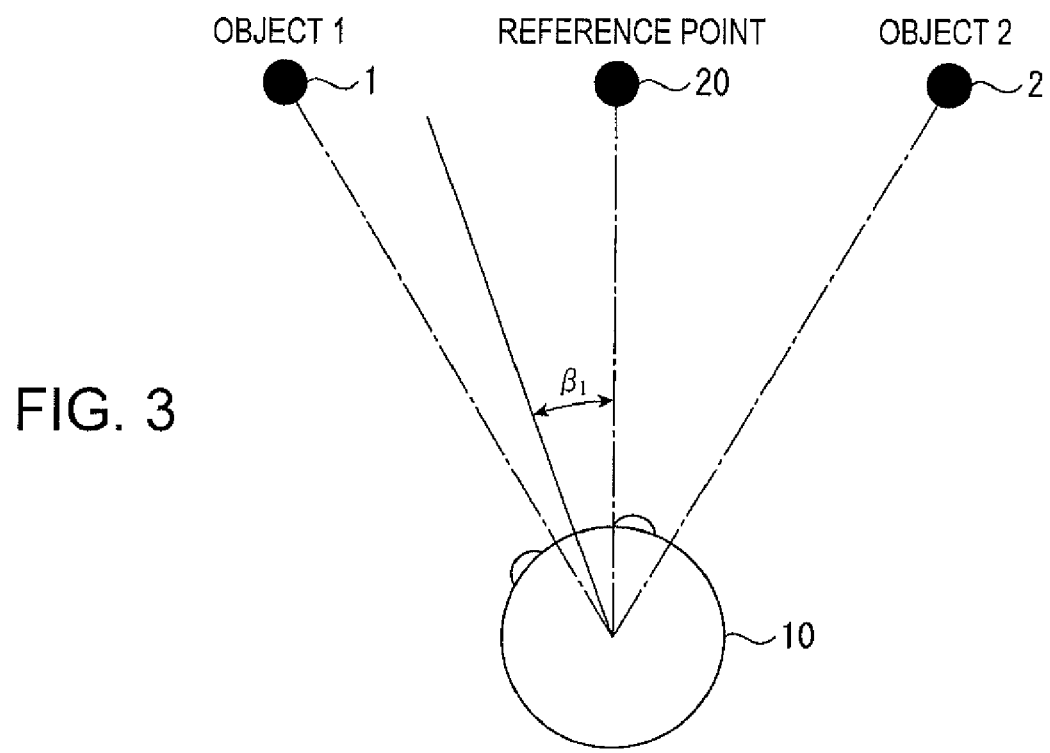
FIG. 3 shows positional relationship when the target person sees the objects according to the embodiment.

Then, a rotation angle $\beta_1$ of the head of the target person 10 rotated when the target person 10 sees the object 1 without lens is measured as illustrated in FIG. 3. Similarly, a rotation angle $\beta_2$ (not shown) of the head of the target person 10 rotated when the target person 10 sees the object 2 without lens is measured. By this method, the rotation angles of the head when the target person 10 sees the objects without lens are obtained (step S2).

Then, visual action index $M_n$ without lens is calculated based on the angles obtained in step S1 and step S2 according to the following equation (1) (step S3). The visual action index is an index expressing the way how a person sees an object, indicating the degree of rotation angle of the head and rotation angle of the eyes.

$$M_n = \frac{\beta_n}{\alpha_n} \quad (1)$$

In the equation (1), n is a numeral representing the corresponding object.

The visual action index $M_n$ is obtained for each of the objects, and an average M of the visual action indexes $M_n$ for all the objects is calculated to use the value M as the visual action index. In this embodiment, n=1 corresponds to the object 1, and n=2 corresponds to the object 2.

Then, a lens is temporarily designed based on the calculated visual action index M, and a lens 30 is manufactured based on the temporary design (step S4).

Figure 4:
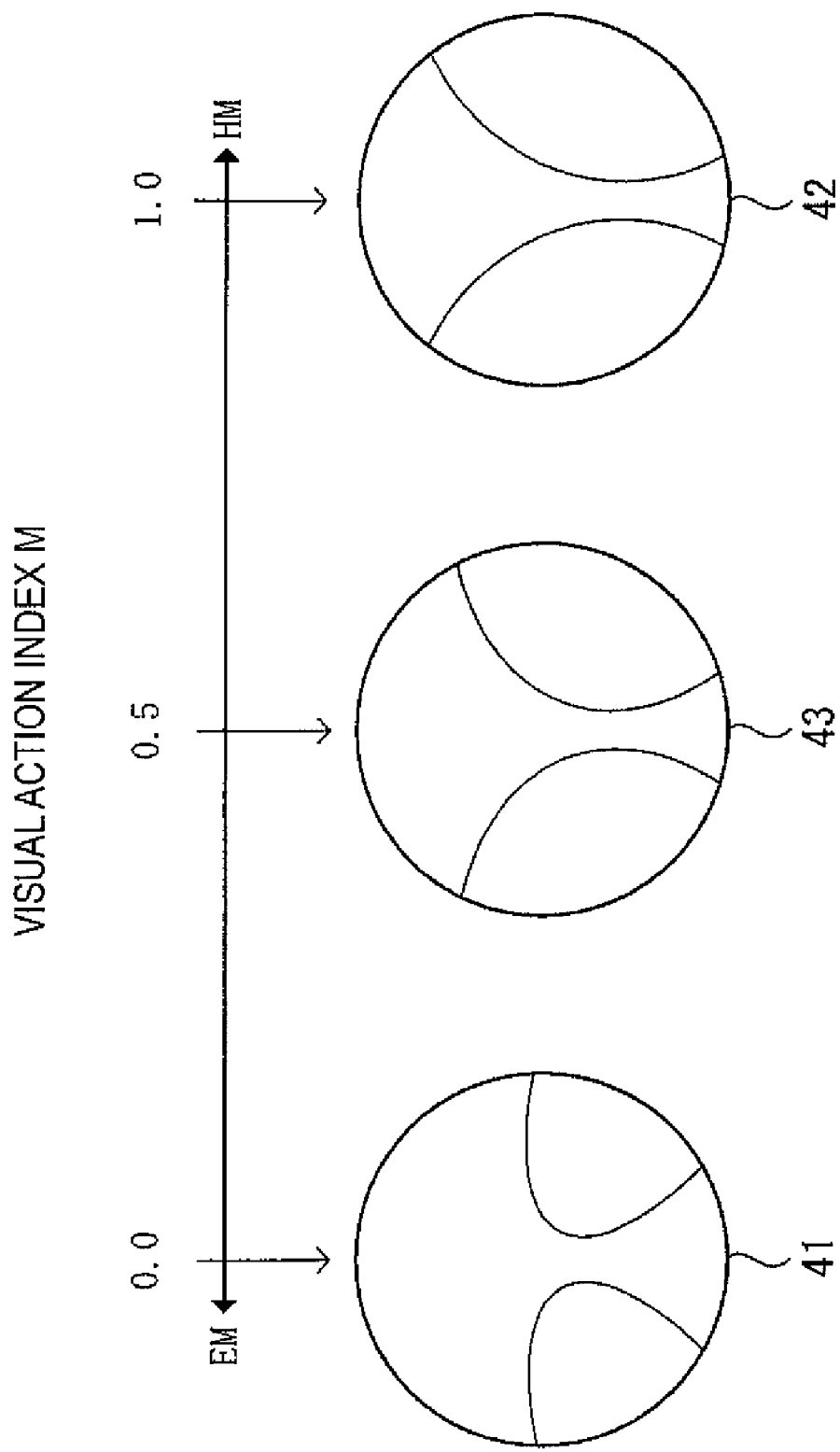
FIG. 4 shows correspondence between visual action index and lens design according to the embodiment.

The lens design is now discussed. For designing the lens, correspondence between the visual action index M and the lens design is established in advance as illustrated in FIG. 4. The lens design includes hard design 41, soft design 42, and balance design 43 having a balance of the hard design 41 and the soft design 42. The hard design 41 is suited for a person having large eye rotation angle (eye mover, EM) as a design providing wide vision design. The soft design 42 is suited for a person having large head rotation angle (head mover, HM) as a design having little waving of images. As illustrated in FIG. 4, the lens design becomes the hard design 41 when the visual action index M is 0.0, the soft design 42 when the visual action index M is 1.0, and the balance design 43 when the visual action index M is 0.5. While three types of lens design are shown in FIG. 4, the lens design is prepared successively or with multiple steps in the range from 0.0 to 1.0 of the visual action index M. Thus, the lens design corresponding to the calculated visual action index M can be selected from various types of lens design prepared beforehand.

The method of manufacturing the lens is not particularly limited but may be any known method. For example, the lens can be manufactured by mechanically processing glass such as semi-finished product or polymer material, molding such as injection molding and pour molding, combination of mechanical processing and molding, or by other methods.

Figure 5:
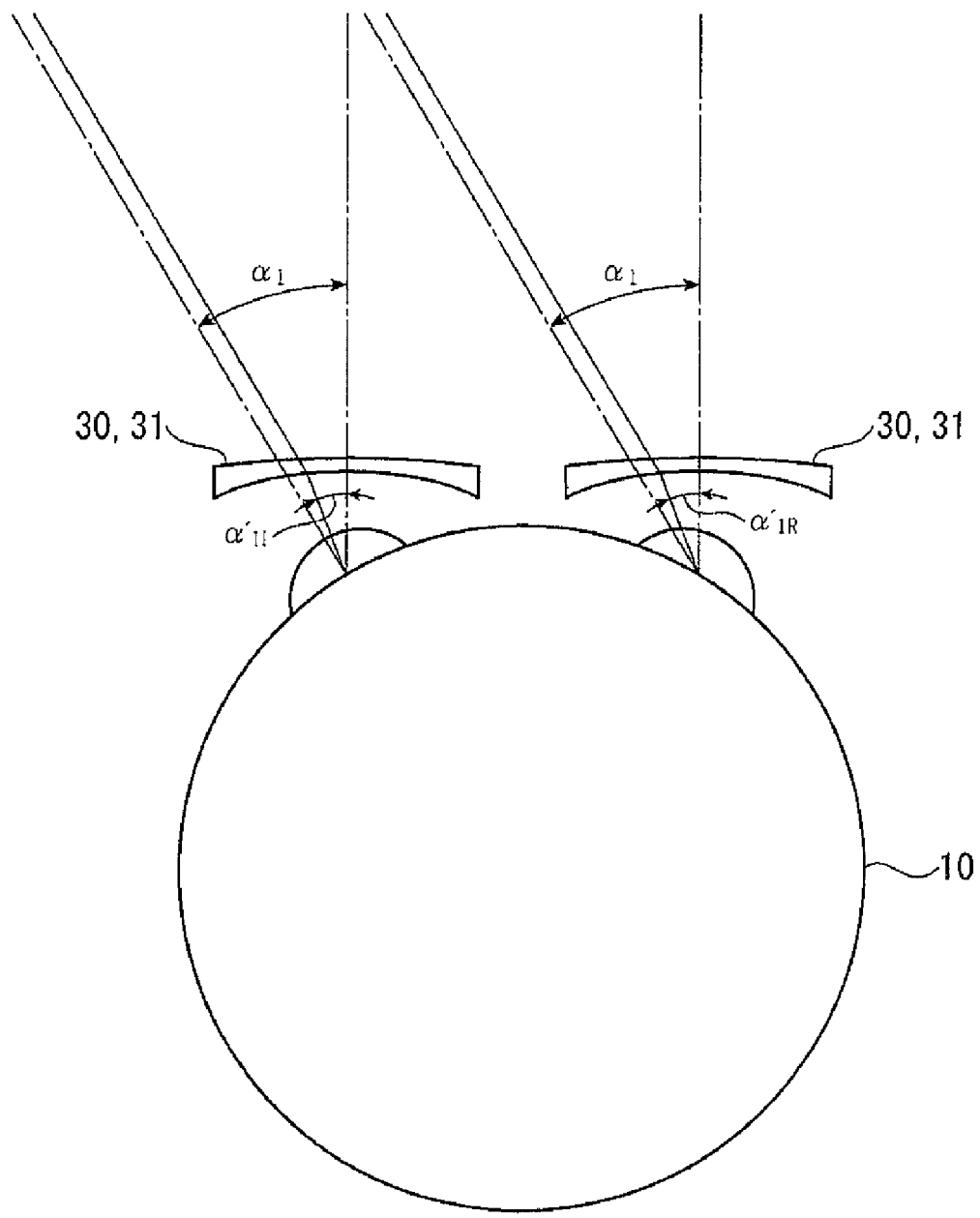
FIG. 5 illustrates a condition when the target person sees the object through a lens according to the embodiment.

Then, the condition of the target person 10 wearing the lens 30 temporarily designed is simulated by light tracing method. More specifically, the directions in which the object and the object 2 are recognized by the target person 10 through the lens 30 are calculated (step S5). As illustrated in FIG. 5, an angle $\alpha'_{1L}$, is an angle formed by the direction of the reference point 20 and the direction in which the object 1 is recognized by the left eye of the target person 10 through the lens 30, and an angle $\alpha'_{1R}$ is an angle formed by the direction of the reference point 20 and the direction in which the object 1 is recognized by the right eye of the target person 10 through the lens 30.

Then, a visual action index $M'_n$ obtained when the target person 10 wears the lens 30 is calculated based on the angle obtained in step S5 according to the following equation (2) (step S6).

$$M'_n = M_n \left( \frac{\alpha'_n + |\alpha'_{nL} - \alpha'_{nR}|}{\alpha_n} \right) \quad (2)$$

In the equation (2), n represents the corresponding object. In this embodiment, n is 1 or 2. The angle $\alpha'_n$ is the angle of the stronger eye direction in the angles $\alpha'_{nL}$ and $\alpha'_{nR}$. Thus, when the stronger eye is the right eye, $\alpha'_n$ becomes $\alpha'_{nR}$.

The visual action index $M'_n$ is calculated for each of the objects, and an average M' of the visual action indexes $M'_n$ for all the objects is obtained to use the average M' as the visual action index after correction.

Then, whether the obtained visual action index M' is converged within a predetermined range is determined (step S7). The predetermined range can be arbitrarily established according to the accuracy of the lens design, such as a range within 0.05.

In this embodiment, it is determined whether the difference between the visual action index M obtained without lens and the visual action index M' obtained through the lens 30 lies within 0.05. When the difference is within 0.05, it is determined that the visual action index M' lies within the predetermined range. Then, the calculation ends.

When the difference between the visual action index M obtained without lens and the visual action index M' obtained through the lens 30 exceeds 0.05, the flow returns to step S4. Then, temporary lens design is again executed based on the visual action index M' obtained in step S6, and a lens 31 is manufactured based on the temporary design. Subsequently, the directions in which the object 1 and the object 2 are recognized through the lens 31 are calculated in the same manner as described above, and a new visual action index M' is obtained according to the above equation (2). In this case, $M_n$ in the equation (2) is fixed to the visual action index M obtained without lens.

By repeating steps S4 through S7 until the visual action index M' is converged within the predetermined range, an optimum lens can be designed.

Then, a spectacle lens is manufactured by a known method based on the lens design obtained in the manner described above as an optimum spectacle lens for the target person 10.

2. Example

An example of calculation based on the above design method is herein shown. This example of lens design includes both for minus lens (concave lens) and plus lens (convex lens). The conditions common to both the lenses are as follows.

Number of objects: 2 (left front: object 1, right front: object 2)

Stronger eye of target person: right

Index angles formed by reference point direction and respective objects directions via target person: $\alpha_1 = \alpha_2 = 40°$ Rotation angles of head of target person seeing objects 1 and 2: $\beta_1 = \beta_2 = 20°$ Visual action index is calculated based on average M of $M_1$ and $M_2$ Allowable range: within 0.05 as variation of visual action index M The visual action index of the target person without lens (before correction) calculated under the above conditions is M=0.50.

2-1. Minus Lens

A minus lens is designed according to the following prescription.

R:S−5.00 C0.00 add 2.00
L:S−5.00 C0.00 add 2.00

Figure 6:
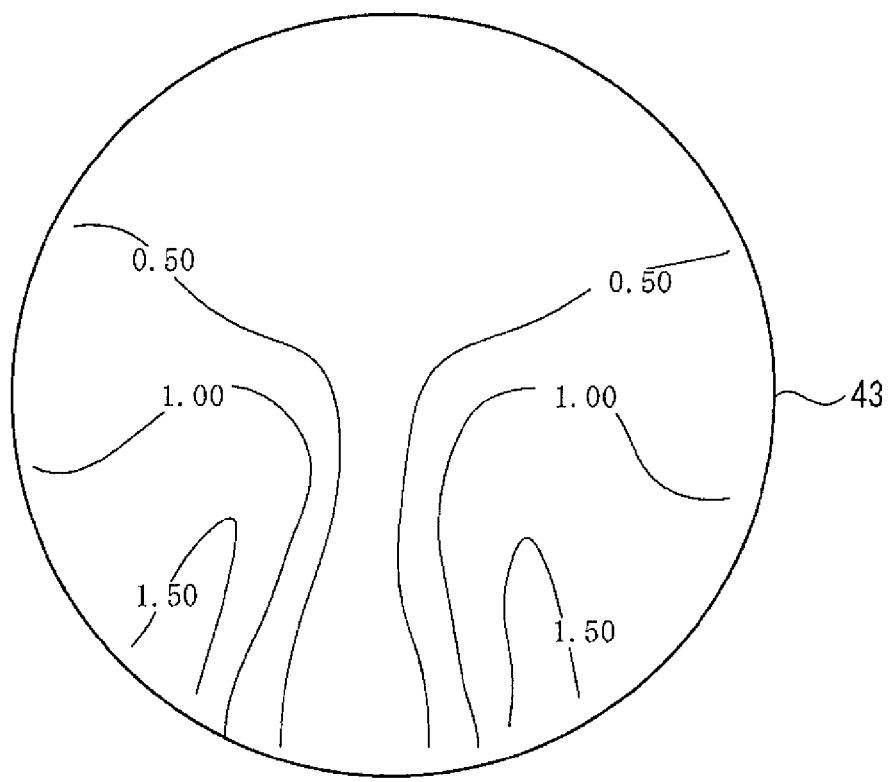
FIG. 6 shows aberration of lens design before correction according to the embodiment.

The balance design 43 is selected as the lens design based on the visual action index before correction M=0.50 according to the correspondence shown in FIG. 4. The detailed aberration of the balance design 43 determined herein is shown in FIG. 6.

When the angle at which the object 1 is recognized through the lens 30 is calculated according to simulation by light tracing method, the angle $\alpha'_{1L}$ formed when the object 1 is seen from the left eye and $\alpha'_{1R}$ formed when the object 1 is seen from the right eye become as follows:

$\alpha'_{1L}=34°$
$\alpha'_{1R}=34°$

A visual action index $M'_1$ obtained by applying the calculation result to the equation (2) in this embodiment is 0.43.

Similarly, the angle $\alpha'_{2L}$ formed when the object 2 is seen from the left eye and $\alpha'_{2R}$ formed when the object 2 is seen from the right eye become as follows:

$\alpha'_{2L}=34°$
$\alpha'_{2R}=34°$

A visual action index $M'_2$ obtained by applying the calculation result to the equation (2) in this embodiment is 0.43.

The average M' of $M'_1$ and $M'_2$ calculated by the above, method is 0.43.

According to comparison between this value and the visual action index M (0.50) before correction, the difference exceeds the allowable range (within 0.05). Thus, lens design is again executed.

Figure 7:
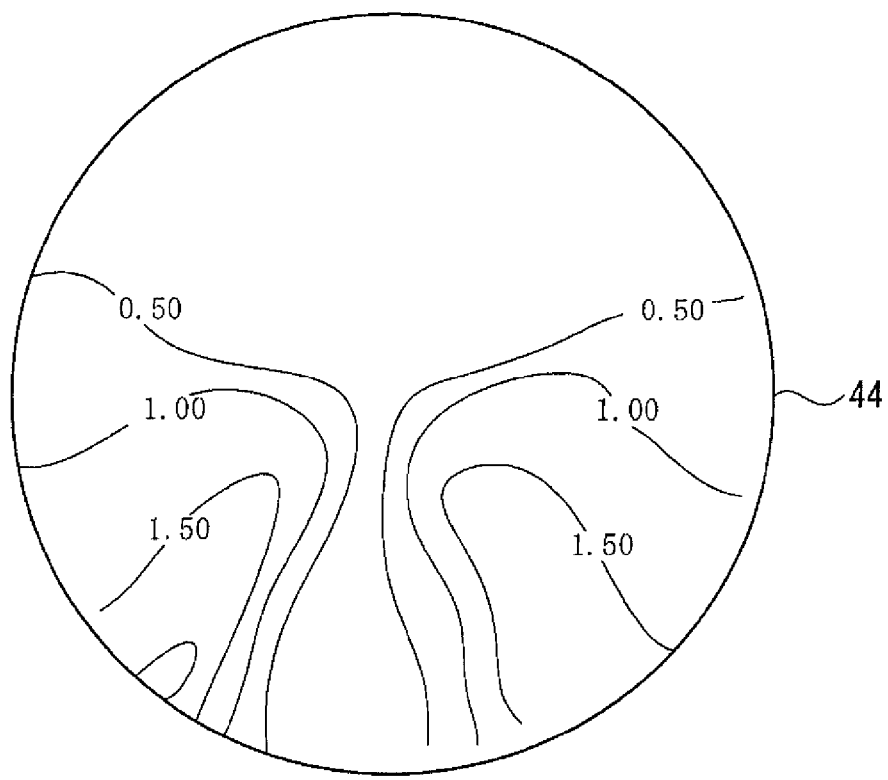
FIG. 7 shows aberration of lens design after correction according to the embodiment.

An appropriate lens design is determined from the correspondence shown in FIG. 4 based on the visual action index M' obtained in the previous lens design. The detailed aberration of the determined lens is shown in FIG. 7.

The angle $\alpha''_{1L}$ formed when the object 1 is seen from the left eye and $\alpha''_{1R}$ formed when the object 1 is seen from the right eye are calculated in the same manner as in the previous lens design:

$\alpha''_{1L}=33°$
$\alpha''_{1R}=33°$

A visual action index $M''_1$ obtained by applying the calculation result to the equation (2) in this embodiment is 0.41.

Similarly, the angle $\alpha''_{2L}$ formed when the object 2 is seen from the left eye and $\alpha''_{2R}$ formed when the object 2 is seen from the right eye are calculated:

$\alpha''_{2L}=33°$
$\alpha''_{2R}=33°$

A visual action index $M''_2$ obtained by applying the calculation result to the equation (2) in this embodiment is 0.41.

The average M" of $M''_1$ and $M''_2$ calculated by the above method is 0.41.

According to comparison between this value and the visual action index M'=0.43, the difference between M' and M" becomes 0.02, which lies within the allowable range smaller than 0.05. Thus, lens design ends.

When lens designs in FIG. 6 and FIG. 7 are compared, the lens design after correction shown in FIG. 7 is closer to hard design. This is because correction giving consideration to power of minus lens and prismatic effect has been carried out.

2-2. Plus Lens

A plus lens is designed according to the following prescription.

R:S+4.25 C0.00 add 2.00
L:S+4.25 C0.00 add 2.00

Similarly to the case of the minus lens, the lens design is determined based on the visual action index before correction M=0.50 according to the correspondence shown in FIG. 4.

When the angle α at which the object 1 is recognized through the lens is calculated according to simulation by light tracing method, the angle $\alpha'_{1L}$ formed when the object 1 is seen from the left eye and $\alpha'_{1R}$ formed when the object 1 is seen from the right eye become as follows:

$\alpha'_{1L}=42°$
$\alpha'_{1R}=42°$

A visual action index $M'_1$ obtained by applying the calculation result to the equation (2) in this embodiment is 0.53.

Similarly, the angle $\alpha'_{2L}$ formed when the object 2 is seen from the left eye and $\alpha'_{2R}$ formed when the object 2 is seen from the right eye become as follows:

$\alpha'_{2L}=42°$
$\alpha'_{2R}=42°$

A visual action index $M'_2$ obtained by applying the calculation result to the equation (2) in this embodiment is 0.53.

The average M' of $M'_1$ and $M'_2$ calculated by the above method is 0.53.

According to comparison between this value and the visual action index M (0.50), the difference lies within the allowable range (within 0.05). Thus, lens design ends.

3. Advantages of Embodiment

According to this embodiment, the following advantages can be offered.

In this embodiment, the lens is designed based on the visual action index M. The visual action index is an index expressing the way how a person sees an object, indicating the degree of rotation of the head or the eyes for seeing the object. Thus, a lens corresponding to the habit of the target person 10 for seeing an object can be designed by using the visual action index.

Moreover, the new visual action index M' is calculated by correcting the visual action index M according to the above equation (2) which considers the direction in which the object is recognized by the target personal 10 through the lens 30 temporarily designed according to the visual action index M obtained when the object, is seen by the target person 10 without lens. Then, the lens 31 is designed based on the visual action index M'.

Since the lens has prismatic effect, the object is recognized in a direction different from the direction where the object actually exists. Thus, visual action of the person without lens is different from visual action of the person wearing the lens. According to this embodiment, correction considering the prismatic effect is performed. That is, lens design is carried out according the visual action of the target person 10 wearing the lens. Thus, a spectacle lens comfortable for the target person 10 for wearing can be provided.

Furthermore, correction is repeated until the visual action index M' is converged. In case of a spectacle lens, particularly a progressive-power lens, prismatic effect varies for each different design even when prescription is the same. Thus, the visual action index M needs to be corrected based on the lens design finally prescribed.

By the lens design based on the converged visual action index M', a spectacle lens comfortable for wearing can be provided.

4. Modified Examples

While the particular embodiment of the invention has been shown and described herein, it is obvious that the invention includes all modifications and improvements of the embodiment from which advantages of the invention can be provided.

According to this embodiment, the object 1 is disposed in the left front of the target person 10, and the object 2 is disposed in the right front of the target person 10. However, the number and positions of the objects may be determined otherwise. For example, a larger number of objects may be disposed at various positions. In this case, the data number to be obtained increases, and reliability of the data improves. Accordingly, a spectacle lens more suited for the target person 10 can be designed.

According to this embodiment, the visual action indexes $M_n$ and $M'_n$ are calculated for the two objects 1 and 2, respectively, and calculation is performed using the average visual action indexes M and M' of the indexes $M_n$ and $M'_n$. However, the visual action indexes $M_n$ and $M'_n$ for the respective objects may be directly reflected on the lens design without using averages. For example, hard design may be applied to the left half of the lens 30, and soft design may be applied to the right half of the lens 30 according to the direction in which the target person 10 sees the object.

In this case, design can be optimized at the respective points of the lens 30. Thus, a spectacle lens more suited for the target person 10 can be designed.

According to this embodiment, the visual action indexes $M_n$ and $M'_n$ expressed by the equations (1) and (2) are used as indexes showing correspondence between visual action of the target person 10 and prismatic effect of the lens. However, the visual action indexes $M_n$ and $M'_n$ are not limited to indexes expressed by the equations (1) and (2) but may be any indexes as long as they determine correspondence between visual action of the target person 10 and prismatic effect of the lens for lens design.

For example, while the visual action index is based on the rotation angle of the head of the target person 10, a value based on the relationship between the rotation center of the head of the target person 10 and the positions of the eyes may be used for calculation of the visual action index when the distances between the target 10 and the objects 1 and 2 are short. In this case, angles formed by the front directions of the left and right eyes and the directions of lines connecting the left and right eyes and the object 1 are calculated by using the angle $\alpha_1$ (see FIG. 5) formed by the front direction of the target person 10 and the direction of the line connecting the target person 10 and the object 1. For example, an angle $\alpha_{1L}$ obtained for the left eye and an angle $\alpha_{1R}$ obtained for the right eye can be calculated by the following equations (3) and (4).

$$\alpha_{1R} = \arctan\left(\frac{l\sin\alpha_1 - r\sin\theta}{l\cos\alpha_1 - r\cos\theta}\right) \tag{3}$$

-continued $$\alpha_{1L} = \arctan\left(\frac{l\sin\alpha_1 + r\sin\theta}{l\cos\alpha_1 - r\cos\theta}\right) \quad (4)$$

provided that $\theta = \arcsin\left(\frac{PD}{2r}\right)$

In the equations (3) and (4), l is the rotation center of the head, r is the radius of the head, and PD is the distance between pupils. By light tracing using $\alpha_{1L}$ and $\alpha_{1R}$, the visual action index M' is calculated in the same manner as in the embodiment for lens design.

When the distances between the target person 10 and the objects 1 and 2 are short, the rotation angle of the head is small. Thus, by using the values based on the relationship between the rotation center of the head and the positions of the eyes as in this example, the reliability of the data further increases.

The entire disclosure of Japanese Patent Application No: 2009-039603, filed Feb. 23, 2009 is expressly incorporated by reference herein.

What is claimed is:

1. A design method of a spectacle lens, comprising:

measuring an angle formed by a direction of a head of a person facing a front direction without a lens and a direction of the head of the person in which an object is recognized, where the object is located in a direction angled to the front direction of the person without the lens;

calculating the angle formed by the front direction of the person and a direction in which the object actually exists to calculate a visual action index $M_n$ according to the following equation (1) as an initial value;

$$M_n = \frac{\beta_n}{\alpha_n} \quad (1)$$

temporarily designing a spectacle lens based on the calculated visual action index $M_n$; and simulating visual action of the person wearing the temporarily designed spectacle lens and calculating a corrected visual action index based on the simulation result wherein $\alpha_n$ is the angle formed by the front direction of the person and the direction in which the object actually exists, $\beta_n$ is a rotation angle of the head of the person in which the object is recognized without the lens, and n represents a number of objects; and when n>1, then $M_n$ is calculated as an average value, wherein the step of correcting the visual action index corrects the visual action index $M_n$ according to the following equation (2):

$$M'_n = M_n((\alpha'_n + |\alpha'_{nL} - \alpha'_{nR}|)/\alpha_n) \quad (2)$$

wherein $M'_n$ is a visual action index after correction, $\alpha'_{nL}$ is an angle formed by the front direction of the person and a direction in which the object is recognized by a left eye of the person through the spectacle lens, $\alpha'_{nR}$ is an angle formed by the front direction of the person and a direction in which the object is recognized by a right eye of the person through the spectacle lens, $\alpha'_n$ is the angle corresponding to the stronger eye of the person in the angles $\alpha'_{nL}$ and $\alpha'_{nR}$.

2. The design method of the spectacle lens according to claim 1, wherein the step of correcting the visual action index is performed until the calculated corrected visual action index is converged.

3. A manufacture method of a spectacle lens which uses the design method of the spectacle lens according to claim 1.

* * * * *